J. ERICKSON.
GRAB HOOK.
APPLICATION FILED MAR. 29, 1918.
1,295,018.
Patented Feb. 18, 1919.
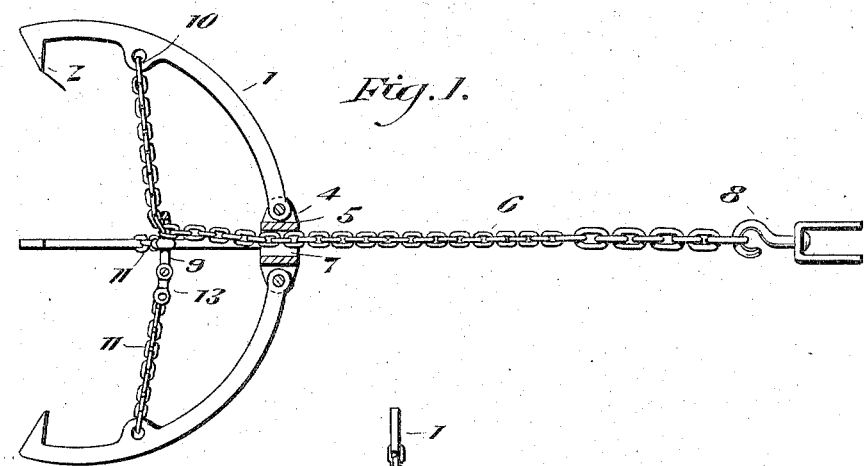
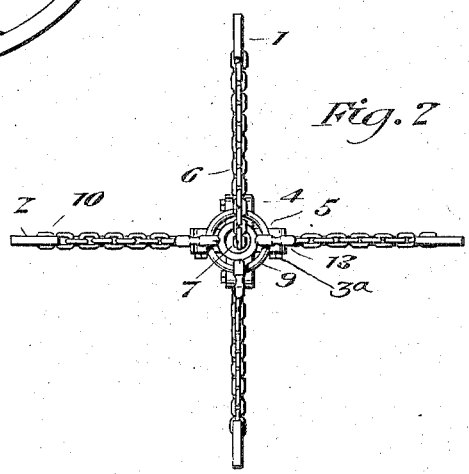
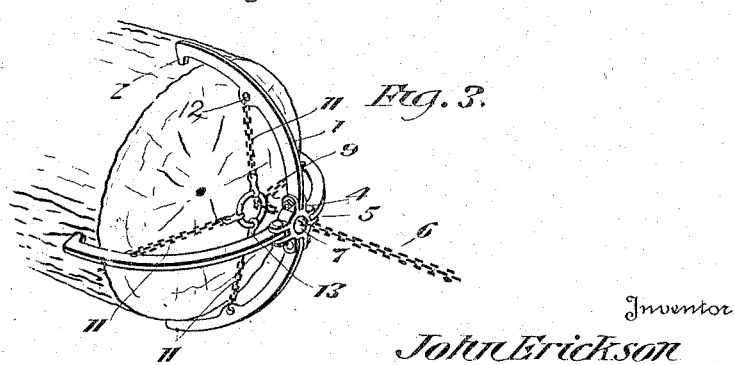
Inventor
John Erickson

UNITED STATES PATENT OFFICE.

JOHN ERICKSON, OF PETERSBURG, VIRGINIA.

GRAB-HOOK.

1,295,018. Specification of Letters Patent. Patented Feb. 18, 1919.

Application filed March 29, 1918. Serial No. 225,538.

*To all whom it may concern:*

Be it known that I, JOHN ERICKSON, a citizen of the United States, residing at Petersburg, in the county of Dinwiddie and State of Virginia, have invented new and useful Improvements in Grab-Hooks, of which the following is a specification.

This invention relates to improvements in grab hooks, especially grab hooks for use in handling logs and heavy pieces of timber by woodmen and log skidders.

One object of the invention is to provide an improved grab hook which is comparatively light.

Another object of the invention is to effect an improvement in the construction of the grab hook so that the prongs of the hook members are prevented from catching in stubs, snags or small objects or other obstructions when the drag hook is in use.

Another object of the invention is to provide an improved grab hook which is adapted to engage around one end of a log so that the log may be dragged endwise.

Another object of the invention is to provide an improved grab hook in which the draft chain is utilized to grip the hook members securely around the end of the log.

Another object of the invention is to provide an improved grab hook in which the stress of the draft chain is distributed to the hook member in such a manner as to automatically accommodate the hook members to the shape of the log and cause all the hook members to be engaged to an equal degree with all sides of the log irrespective of the shape of the log.

With the above and other objects in view the invention consists in the construction, combination and arrangement of devices hereinafter described and claimed.

In the accompanying drawing:—

Figure 1 is a side elevation, partly in section of a grab hook constructed and arranged in accordance with my invention.

Fig. 2 is a plan of the same partly in section.

Fig. 3 is a perspective view of the same on a smaller scale, and showing the drag hook applied around one end of the log.

In the embodiment of my invention I provide a series of radially arranged and pivotally connected hook members 1, which are segmental in form and each of which is provided at its free or outer end with an inwardly extending prong 2 which is adapted to be embedded in one side of a log, the hook members being adapted to be arranged around the ends of a log, as is indicated in Fig. 3.

The pivot $3^a$ of the hook members are here shown as bolts and the said bolts pass through openings in the arm 4 of segment members 5 which are arranged between the pivotal ends of the hook members, each hook member being arranged between the opposing end of two of the segment members and said segment members coacting with the pivot bolts to securely connect the inner or pivotal ends of the hook members together.

A draft chain 6 passes through and is freely movable in the central openings 7 which is formed by the segment members 5. At its outer end the drag chain is provided with a suitable clevis 8. The drag chain passes through and is slidably engaged in a ring 9 and the innner end of the drag is connected to one of the hook members, at a point a suitable distance from the outer end of the hook member, by means of a swivel 10.

A short chain 11 is used for each of the other hooks, each short chain being connected at its outer end as at 12 to one of said hooks and having its inner end connected by means of a swivel 13 to the ring 9. Hence the drag chain is directly connected to one of the hook members and is also connected to each of the other hook members by means of the ring 9 and the short chain 11, and moreover the drag chain is free to move in some extent through the rings 9, the said rings forming a connecting element and also forming a direction element for the drag chain as will be understood.

When the drag hook has been arranged at one end of a log or piece of timber the prongs of its hook members need be driven into the sides of the log to only a slight extent, as the draft stress of the chain 9 is not only applied to the hook member to which the said chain is attached directly but is also distributed to the other hook members through the rings 9 and the short chain 11 so that the chains serve to draw the free end of the hook members toward each other and the result is that the heavier the log and the greater the degree of draft stress the more firmly the hook members are engaged with the log. Hence there is no danger of the drag hook becoming casually disengaged from the log. Moreover, my improved drag hook may be readily attached directly to one end of the log so that the draft stress is applied longitudinally of the log and the log may be drawn endwise instead of sidewise as has been usual heretofore by the drag hook theretofore in common use.

The construction and shape of the hook members of my drag hook are such as to obviate all danger of the drag hook becoming caught on snags, saplings or other obstructing objects when the drag hook is in use.

While I have herein shown and described a preferred form of my invention I would have it understood that changes may be made in the form, proportion and construction of the several parts without departing from the spirit of my invention and within the scope of the appended claims.

Having thus described the invention what is claimed is:—

1. A grab hook comprising a series of radially arranged pivotally connected hook members, a drag element slidably guided between the pivotal ends of the hook members and directly connected to one of said hook members, a direction element engaged by the drag element, and short drag elements connecting said direction elements and the other hook members.

2. A grab hook comprising a series of radially arranged hook members, spacing means between the inner ends of the hook members and to which the hook members are pivotally connected, said spacing means forming a central opening between the inner end of the hook members, a drag element slidably guided through said openings and directly connected to one of the hook members, a direction element engaged by the drag elements and short drag elements connecting said direction elements and the other hook members.

3. A grab hook comprising a series of radially arranged members, each having an inwardly extending prong at its outer end, segment members between the inner ends of the hook members and to which the inner ends of the hook members are pivotally connected, said segment members forming a central opening between the inner, pivotal end of the hook members, a draft chain slidably guided through said openings and directly connected to one of the hook members, a ring slidably engaged by the said chain and forming a direction element therefor, and short chains connected to said ring and to the other hook elements.

In testimony whereof I affix my signature.

JOHN ERICKSON.

Copies of this patent may be obtained for five cents each, by addressing the "Commissioner of Patents, Washington, D. C."